US008170907B2

(12) United States Patent
Puri et al.

(10) Patent No.: US 8,170,907 B2
(45) Date of Patent: May 1, 2012

(54) SYSTEM FOR OPTIMIZING TRADE PROMOTION AND DISTRIBUTION SPENDING IN FRAGMENTED MARKETS

(75) Inventors: Namit Puri, Delhi (IN); Vinay Raghunath, New Delhi (IN); Ayan Sen, Gurgaon (IN); Sriraman B. Venkataraman, Koramangala (IN)

(73) Assignee: Accenture Global Services Limited, Dublin (IE)

( * ) Notice: Subject to any disclaimer, the term of this patent is extended or adjusted under 35 U.S.C. 154(b) by 980 days.

(21) Appl. No.: 12/145,929

(22) Filed: Jun. 25, 2008

(65) Prior Publication Data

US 2009/0259520 A1 Oct. 15, 2009

(30) Foreign Application Priority Data

Apr. 11, 2008 (IN) .......................... 839/MUM/2008

(51) Int. Cl.
*G06F 17/50* (2006.01)
(52) U.S. Cl. ..................................... 705/7.33
(58) Field of Classification Search .................. 705/7.33
See application file for complete search history.

(56) References Cited

U.S. PATENT DOCUMENTS

| 6,286,005 B1 * | 9/2001 | Cannon .......................... 455/2.01 |
| 6,567,786 B1 * | 5/2003 | Bibelnieks et al. ........ 705/14.44 |
| 7,653,568 B2 | 1/2010 | Keller et al. |
| 2002/0123930 A1 * | 9/2002 | Boyd et al. ...................... 705/14 |
| 2003/0233339 A1 * | 12/2003 | Downs .............................. 707/1 |
| 2006/0004653 A1 * | 1/2006 | Strongin, II ..................... 705/39 |
| 2008/0235073 A1 * | 9/2008 | Cavander et al. ................ 705/9 |

OTHER PUBLICATIONS

Mols, Niels Peter, et al. "Micro- and Macro-Segmentation of the European Market for Cash Management Services." University of Aaarhus, Denmark, ISSN 1398-6228, Working Paper 1998-10, Sep. 25, 1998.*
de Juan, Rebeca. "The Independent Submarkets Model: An Application to the Spanish Retail Banking Market." UNED, PIE-FEP, Feb. 2003.*
Buzzacchi, Luigi, et al. "Firm Size Distribution: Testing the 'Independent Submarkets Model' in the Italian Motor Insurance Industry." The Toyota Centre Suntory and Toyota International Centres for Economics and Related Disciplines, Discussion Paper No. EI/24, Sep. 1999.*
Lerer, Leonard. "Pharmaceutical Marketing Segmentation in the Age of the Internet." International Journal of Medical Marketing, vol. 2, No. 2, pp. 159-166, 2002.*

* cited by examiner

*Primary Examiner* — Susanna M Meinecke Diaz
(74) *Attorney, Agent, or Firm* — Brinks Hofer Gilson & Lione

(57) ABSTRACT

A system for optimizing incentive-based spending parameters associated with goods provided by a manufacturer in fragmented markets includes a data collection component configured to aggregate data, and an analysis module, which applies regression analysis based on key segmentation variables. A segmentation module separates the aggregated data into final segments based on identified key segmentation variables. The analysis module applies regression analysis to each final segment to identify incentive-based spending parameters and generates response curves. A report generator provides a graphical output of the respective response curves.

25 Claims, 7 Drawing Sheets

SYSTEM FOR OPTIMIZING TRADE PROMOTION AND DISTRIBUTION SPENDING IN FRAGMENTED MARKETS

BACKGROUND OF THE INVENTION

1. Cross-Reference To Related Applications

This application claims the benefit of priority from Indian Patent Application No. 839/MUM/2008, filed on Apr. 11, 2008, entitled System For Optimizing Trade Promotion And Distribution Spending In Fragmented Markets, and is hereby incorporated by reference in its entirety 2. Technical Field This disclosure relates to data processing systems for optimizing marketing spending to obtain a maximum marketing return-on-investment. In particular, this disclosure relates to computer systems and algorithms for analyzing and optimizing trade promotion and distribution expenditures in fragmented markets in order to maximize profits.

3. Background

Due to changes in both market conditions and technology, traditional, brand-oriented advertising is no longer the primary driver of customer behavior. This may be reflected by dwindling print newspaper circulation and market stagnation for network television commercials. Although "above-the-line" (ATL) marketing techniques, which focus on reaching a broad population, are still important, "below-the-line" (BTL) marketing techniques, which focus on targeted, customer-oriented communications, have become increasingly important.

ATL or traditional marketing approaches are directed to a mass audience with messages that attempt to reinforce a particular brand, communicate general product information, or seek to elicit an emotional response. ATL marketing approaches include television, radio, Internet advertising, print advertising, outdoor advertising, Yellow Pages advertising, and agency costs.

In contrast, BTL approaches are more aligned with traditional direct marketing efforts, which attempt to provide targeted relationships between marketers and individual consumers. The effectiveness of BTL approaches is easier to measure and quantify than ATL approaches. BTL marketing approaches include direct mail, direct response broadcast, direct response print advertising, event marketing, interactive marketing, and consumer and trade promotional marketing. Factors that may be responsible for the shift from ATL to BTL approaches with respect to marketing effectiveness (profit) include changing consumer demographics, increased consumer sophistication, widespread marketing "clutter," enhanced availability of information, increased client pressure to deliver measurable value, growing effectiveness of "multi-channel" campaigns, and technological advances.

However, BTL marketing approaches are difficult to deploy, optimize, and effectively quantify in fragmented markets. For example, emerging markets, such as India, China, Brazil, and Vietnam, are often fragmented. Fragmented markets are characterized by a large number of channel partners, trade intermediaries, and retailers, which form a multi-tier network structure. For example, it is estimated that about 95% of India's retail market is fragmented. Unlike developed markets where suppliers deal directly with a few large retailers, fragmented markets have multi-tier distribution and front-end structure, which render BTL marketing approaches difficult to optimize and evaluate. Similarly, trade promotion and distribution spending are difficult to deploy, optimize, and effectively quantify in fragmented markets.

A large consumer packaged goods (CPG) entity with revenue in the $300 Million range, which may be typical of a large CPG entity in India's fragmented market, may have a complex, multi-tiered distribution network. It is not unusual for such a large CPG entity in a fragmented market to have about 25-30 warehouses, about 1,500-2,000 distributors or stockists depending on the size and presence of the manufacturer, about 10,000-15,000 wholesalers or intermediaries, and about 2-12 million retailers. Entities with which the manufacturer has a relationship, whether direct or indirect, may be referred to as "channel partners." Markets having about at least 1 million selling entities or channel partners may be considered to be fragmented.

The warehouses, also referred to as carrying and forwarding agents or CFAs, may act as a direct link between the manufacturer and the trade and further serve as the representative of the company who holds the stock (inventory) on behalf of the company. The objective of the CFA is to ensure continuous supply to distributors or "stockists" and to direct retailers. The CFA typically receives a margin of about 2% to about 4% depending on the volume of business handled.

The distributors or stockists are an important link in the distribution network structure because they purchase stock (inventory) from the manufacturer, invest in redistribution infrastructure (sales force, trucks, vans, etc.), and proactively service retailers and wholesalers to meet sales and distribution goals of the manufacturer. Stockists typically receive about 5% to about 6% of the retailer's sales price.

The wholesalers act as an intermediary between the stockist and the retailer, and help extend the coverage of a product by selling to retailers. The retailer is the last point of contact between the network and the end consumer. Retailers typically receive about a 10% to about 15% profit margin on most products.

Accordingly, it is difficult to optimize trade promotion and distribution marketing techniques and/or expenditures ("spends") so as to maximize the manufacturer's profit in such fragmented markets where data from disparate platforms and channel partners is not organized, and may not even be linked across computing platforms. Further, due to the disparate platforms it is very difficult if not impossible to obtain cohesive information regarding sales and performance based on data provided by the various channel partners. Also, the large volume of data from between 2 million to 12 million retailers in a fragmented market compounds the difficulties of memory allocation and data processing efficiency when using conventional optimization algorithms.

SUMMARY

A system for optimizing incentive-based spending parameters associated with goods provided by a manufacturer in fragmented markets includes a computer having a processor and memory and a data collection component configured to aggregate data for sales of goods associated with a plurality of selling entities. An analysis module applies regression analysis to a portion of the aggregated data corresponding to the plurality of selling entities, based on key segmentation variables to identify a key segmentation variable having a highest correlation with sales revenue. A segmentation module separates the aggregated data corresponding to the selling entities into final segments based on selected ranges of the identified key segmentation variable. The analysis module applies regression analysis to each final segment to identify incentive-based spending parameters having a highest correlation with sales revenue and generates for each final segment, one or more response curves corresponding to the identified incentive-based spending parameters. A report generator provides a graphical output of the respective response curve.

A method for optimizing trade promotion and distribution incentive-based spending parameters associated with goods provided by a manufacturer in fragmented markets includes collecting data relating to sales of goods associated with a plurality of retailers, separating the aggregated data corresponding to retailers into coarse segments based a predetermined portion of the plurality of retailers, and applying regression analysis to each of the coarse segments based on key segmentation variables to determine a primary key segmentation variable and a secondary key segmentation variable, where the primary and the secondary key segmentation variables having a highest correlation with sales revenue. Processing separates the aggregated data corresponding to retailers into sub-segments based on predetermined ranges of the primary key segmentation variable and divides the sub-segments into final sub-segments based on predetermined ranges of the secondary key segmentation variable. Regression analysis is applied to each final sub-segment to identify incentive-based spending parameters having a highest correlation with sales revenue and for each final sub-segment one or more response curves are generated corresponding to the identified incentive-based spending parameters. A graphical output is provided for the response curves, where the respective response curves provide an indication of the relationship between a selected value of the identified incentive-based spending parameter and a profit level of the manufacturer.

A need exists to calculate optimal spend parameter values in fragmented markets. Accurate determination of spend parameters necessitates organizing and correlating sales data in otherwise unrelated databases. Further, application of regression analysis in iterative segmentation processes utilizes computational resources efficiently.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
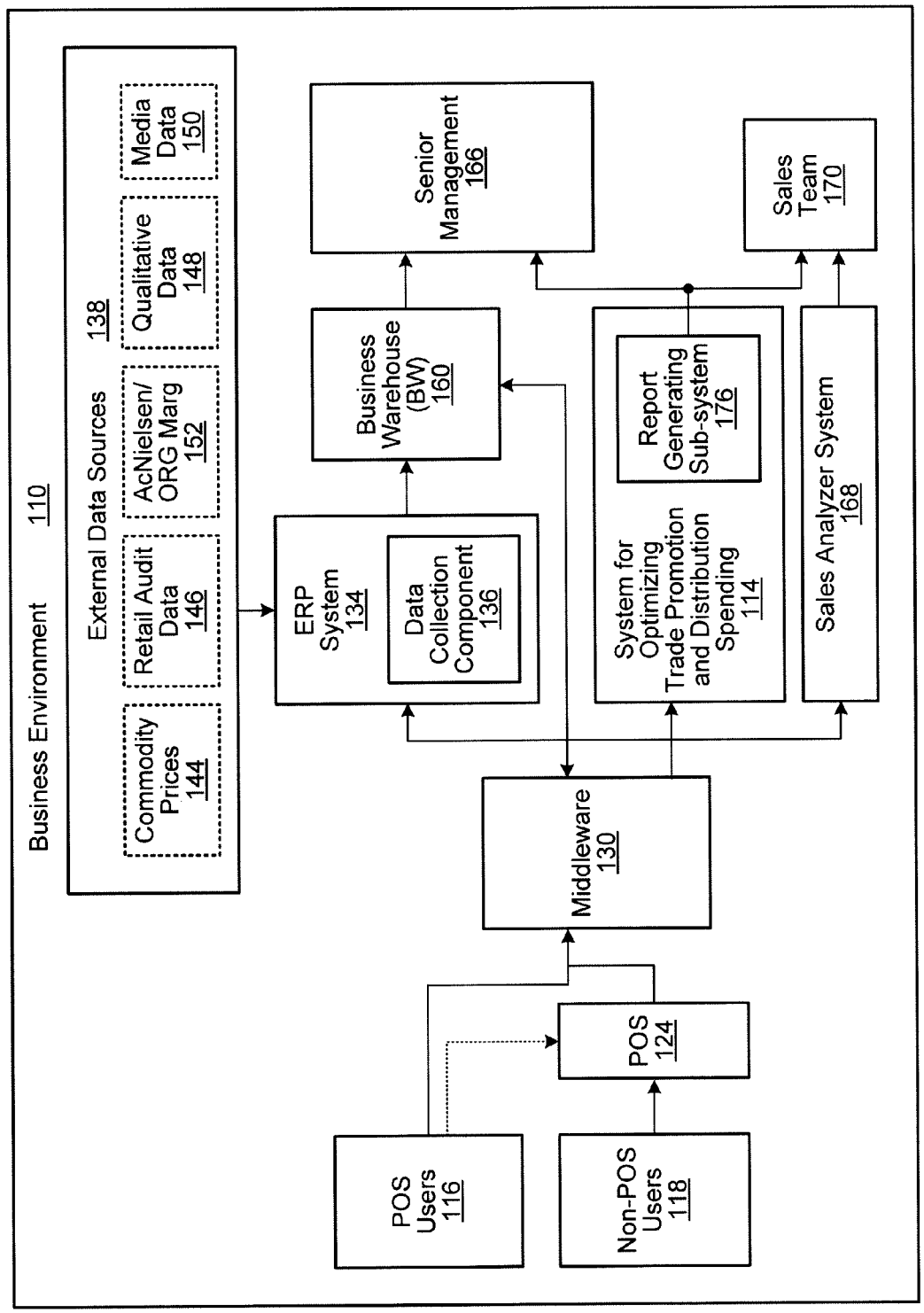
FIG. 1 shows a product marketing environment.

FIG. 1 shows a business environment 110 in which a system for optimizing trade promotion and distribution spending 114 may be used. The environment 110 may include point-of-sale (POS) users 116 and non-POS users 118, who may provide input to various POS systems 124. The POS user systems 124 may provide data to "middleware" software or systems 130, which may be part of an enterprise system or enterprise resource planning (ERP) system 134. The ERP system 134 may include a data collection component 136. In some applications, the data collection component 136 may be separate from the ERP system 134. The ERP system 134 may be a commercially-available system, which may, for example, be provided by SAP, Oracle, or BAAN in conjunction with platform providers, such as IBM, Hewlett-Packard, or Dell. Other ERP systems providers and platform providers may be used. The ERP system 134 may receive data from external data sources 138. Such external data sources 138 may provide commodity price data 144, retail audit data 146, qualitative data 148, media data 150, and data from third-party providers, such as A. C. Nielsen 152 and the like.

The ERP system 134 may be coupled to a "business warehouse" or "BW" system 160. The BW 160 system may also communicate with the middleware system 130. The BW system 160 may receive data from the ERP system 134 and may manipulate the data to generate various reports for senior management 166. The ERP system 134 may be coupled to a sales analyzer system 168 in some applications or business configurations. The sales analyzer system 168 may generate reports involving monthly revenue, annual revenue and sales numbers, and productivity values, which may be provided to sales personnel 170. The system for optimizing trade promotion and distribution spending 114, also referred to as a trade promotion optimizer (TPO), may receive data from the middleware system 130 and may optimize various marketing or incentive-based trade promotion and distribution expenditures (referred to as "spends," "spend/spending levers," "spend/spending drivers," "spend/spending parameters" and/or "spend/spending variables") based on the data. The system for optimizing trade promotion and distribution spending 114 includes a report generating sub-system 176, which may provide reports and graphical output displays to senior management 166 and sales personnel 170. Other systems and/or platforms in which the system for optimizing trade promotion and distribution spending 114 may be included or operatively coupled to, may be described in, for example, U.S. Pat. No. 6,871,183, entitled System and Method of Preparing and Processing Data for Trade Promotion, filed Jan. 24, 2001, which is hereby incorporated by reference in its entirety.

Incentive-based marketing expenditures or spends may include, for example, consumer and trade promotions, local promotions, product scheme discounts, trade discounts, trade marketing incentives, servicing spends, and visual and merchandizing expenditures. Trade promotion and distribution sales and distribution spends may include, for example, infra-subsidy spends, performance incentives, salary and wages, operational costs, and information technology spends. Other trade promotion and distribution spends may be analyzed and optimized. In some applications, spend drivers involving discounts may be divided according to brands and products, while spend drivers involving discount schemes may include free goods discounts.

Note, however, that such discounts do not typically refer to price discounts provided to the end user or consumer. Rather, such discounts and incentives typically refer to those provided to the retailer. These discounts and incentives are designed to "incentivize" the retailer to act like promoters of the manufacturer's products. Such discounts and incentives are provided to the retailer rather than to the end-purchaser due to the nature of retail establishments in fragmented markets. In fragmented markets, the retailers are not like conventional stores that are common in developed markets. Rather, the retailers in fragmented markets may be very small "mom and pop" store fronts or "walk-up" windows where customers request a certain type of product from the proprietor. The proprietor may therefore use his or her discretion in selecting the brand of product provided to the customer. Thus, the discounts and incentives provided to the retailer may influence the retailer's decision to stock certain products and/or may influence the retailer with respect to selecting a specific manufacturer's goods in response to a request for a generic product or product type from the customer.

Optimization of the incentive-based spends may result in increasing or maximizing profit for the manufacturer or entity providing the product or products. The reports generated by the system for optimizing trade promotion and distribution spending 114 may contain "recommendations" with regard to the various incentive-based spends, that is, whether to increase, decrease, or leave unchanged the various incentive-based spends.

As mentioned above, incentive-based spends or spend drivers may include incentives and discount schemes. With respect to a particular good sold in conjunction with a discount, incentive, or other spend lever, there may be two possible outcomes based on the monetary level to which the spend lever is set. If the spend lever is set too low, the manufacturer may not reap available incremental profit. If the spend lever is set too high, such as when excessive discounts are provided to retailers, the manufacturer loses profits and is essentially "self-gouged."

Figure 2:
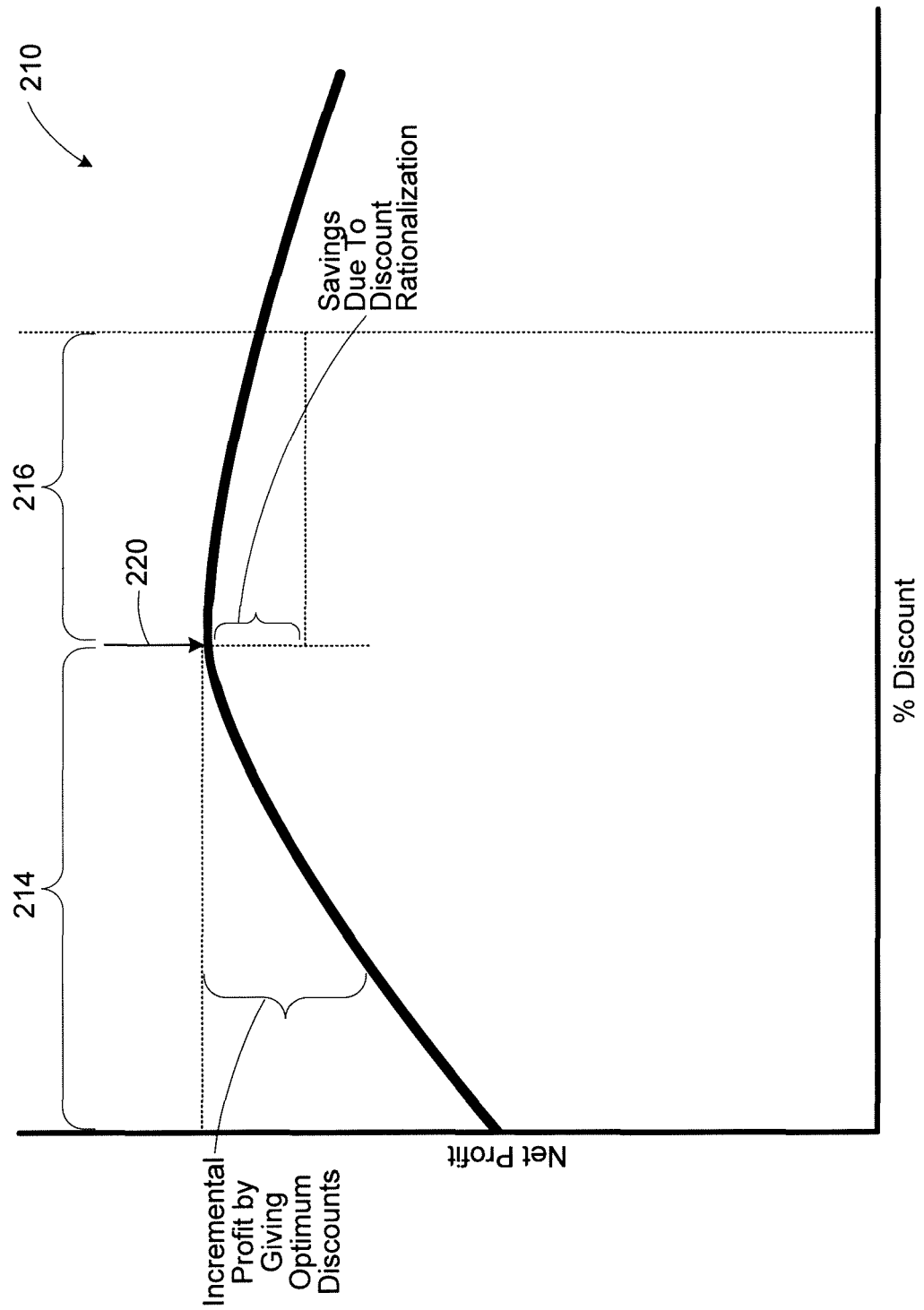
FIG. 2 is a graph showing net profit as a function of percent discount.

FIG. 2 shows a graph 210 comparing discount percentage against net profit. The graph 210 shows that an optimal spend lever value will maximize profits. Along a first region 214 of the graph 210, net profit increases incrementally as the discount percentage (the spend lever) increases. However, a second region 216 of the graph 210 shows that net profit decreases as the discount percentage continues to be increased because the discount provided overrides the profit increase. The optimal value for the spend lever, which maximizes net profit, is shown by reference numeral 220.

Data may be captured from disparate systems and from various channel partners. As such, much of the data captured is disjointed, captured at different frequencies (e.g., daily, weekly, monthly), and may be provided in multiple and often incompatible formats. Such data may be filtered or "cleansed" before being analyzed. Due to the data format variability from various sources, the data may first be converted into files having a common format. To cleanse for missing data values, imputation and outlier analysis may be performed. Data aggregation may be performed to normalize the data to the same frequency level. Further cleansing may be performed in accordance with predetermined business rules (for example, that all channel partners with less than two months of history are not included). All of the data may be merged into one master file or cohesive data set on which analysis is performed.

Figure 3:
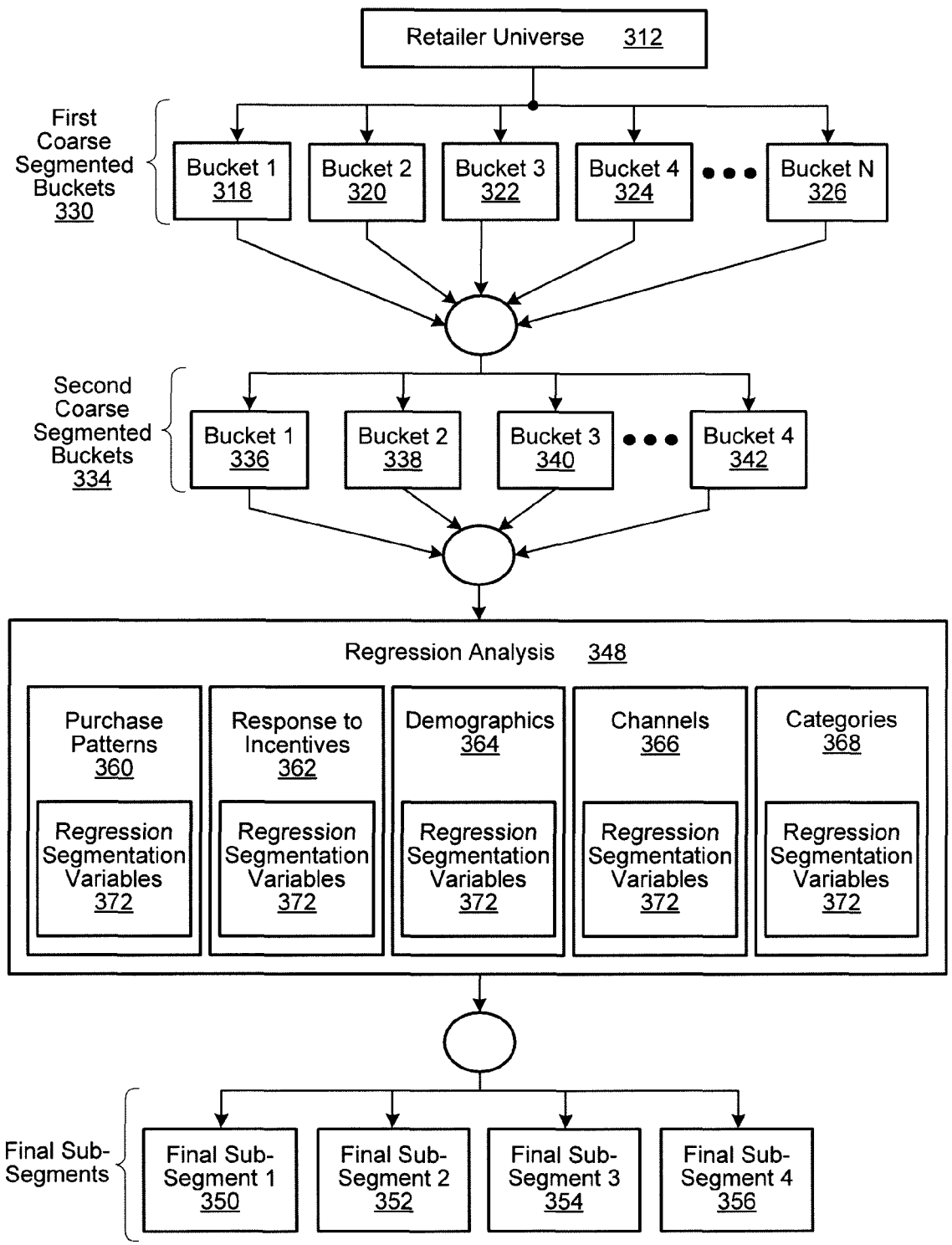
FIG. 3 is a data flow block diagram showing segmentation of retailers and regression analysis.

Once the data has been captured and organized, the retailers may be segmented into groups based on statistical techniques. FIG. 3 shows a high-level data flow block diagram of a "universe" of retailers 312 where each of the retailers, or more specifically, data corresponding to the retailers, is separated into a plurality of fixed bins or "buckets" 318, 320, 322, 324, and 326 (also referred to as blocks) based on the number of retailers. The universe of retailers 312 may be large, may be greater than 100,000 retailers, and may often be greater than 1 million retailers. There is no theoretical upper limit regarding the number of retailers when applying the system for optimizing trade promotion and distribution spending 114.

The fixed number of buckets 318-326 may be an arbitrary number. For example, twenty buckets may be used to initially group all of the retailers. All of the retailers are initially ranked in ascending order based on sales volume or another characteristic attribute. A fixed number of retailers in sequential order are then placed in the first bucket 318. For example, if there are 350,000 retailers in the universe of retailers 312, the first bucket 318 may contain the first 17,500 retailers and their corresponding data. The first 17,500 retailers are grouped into the first bucket 318 irrespective of the value of their corresponding sales volume, as long as each retailer is sequentially ordered. This may be referred to as a first coarse segmentation process. Each bucket 318-326 may have a fixed "width," such as 5% of the total number of retailers 312, or the buckets may be organized according to a different scheme. Any suitable percentile value may be used to provide an initial or coarse segmentation based on a fixed percentage of the number of retailers relative to the total number of retailers 312. The buckets 318-326 may have an equal or unequal width as long as the total of all buckets accommodates 100% of the retailers. The buckets 318-326 may be referred to as first coarse segmented buckets 330 or blocks. Note that for any particular retailer placed in a specific bucket, all data concerning that retailer is available for analysis.

The first coarse segmented buckets 330 may then be processed and grouped together to reduce the number from twenty, for example, to a lesser number, for example, between three and six buckets. Four buckets are shown in this specific example. The buckets 318-326 may be processed to identify logical or natural breaks in the sales volume corresponding to the retailers in the bucket so as to aggregate the buckets into a fewer number of buckets. This process may be referred to as a second coarse segmentation process. For example, there may be a gradual increase in the total sales volume of the retailers from the first bucket 318 to the second bucket 320, and a similar gradual increase in the total sales volume of each of the retailers from the second bucket 320 to the third bucket 322. However, there may be a sudden shift or jump in the total sales volume of specific retailers from the third bucket 322 to the fourth bucket 324. In such a situation, the retailers who were initially segmented into the first through third buckets 318, 320, and 322 may be aggregated into a single bucket, thus consolidating or reducing the total number of buckets. The number of buckets remaining after the second coarse segmentation is preferable between about three buckets to about six buckets.

If a clear break or shift is not readily apparent within a bucket or from bucket to bucket based on the sales volume values of the retailers, a logical break may be established when the sales volume of a selected retailer is about three times greater than the sales volume of the smallest retailer in the bucket. Thus, the minimum to maximum sales volume ratio of the retailers in any particular bucket may be about 1:3. This may result in a reduction from about twenty buckets to about six buckets (rounded down). Any suitable reduction ratio may be used, such as, for example a ratio of about 1:2 (10 buckets reduced from 20 buckets) to about 1:4 (5 buckets reduced from 20 buckets). The buckets identified by the second coarse segmentation process may be referred to as the second coarse segmented buckets 334 or blocks. The first and second coarse segmentation processes may be referred as a "subjective" segmentation approach.

After the universe of retailers 312 has been separated into about three to about six buckets 336-342 by the second coarse segmentation process, regression analysis 348 is applied to obtain homogeneous segmented blocks (final segments or final sub-segments 350-356). Regression analysis is applied to each of the second coarse segmented buckets 334 to identify homogenous groups that have a similar response to each of the parameters or variables regressed.

Regression analysis is applied to the second coarse segmented buckets 334 using selected key groups of variables. The key groups of variables may relate to, for example, purchase patterns 360, response to incentives 362, demographics 364, channels 366, and categories 368. Channels may relate to a basic type of retailer or store, such as a pharmacy, a general store and the like. Some of the variables corresponding to the key groups are shown in Table 1 below, and may be referred to as regression segmentation variables 372.

TABLE 1

REGRESSION SEGMENTATION VARIABLES

| PURCHASE PATTERNS | RESPONSE TO INCENTIVES | DEMO- GRAPHICS | CHANNELS | CATE- GORIES |
|---|---|---|---|---|
| number of bills cut (orders per month) | retailer discounts | geographical population group (rural v. urban) | percent revenue | number of bills cut |
| average number of lines (number of items in each order) | schemes | NEWS classification | number of visits | percent revenue split |
| revenue per bill or order. | window displays | | conversion ratio cost of servicing | |

Figure 4:
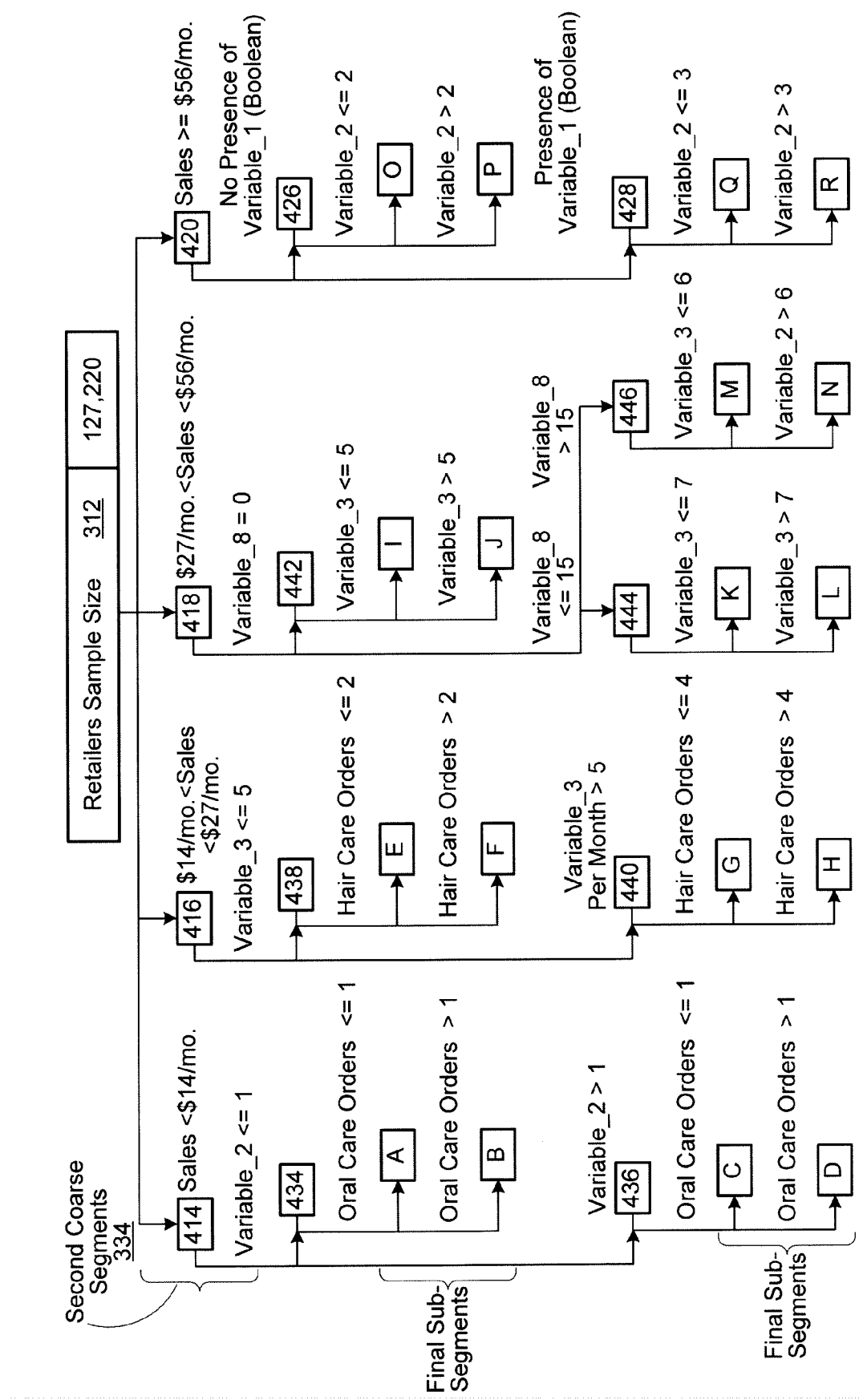
FIG. 4 shows a specific example of segmentation and regression to obtain final sub-segments.

FIG. 4 shows a specific example of a business having six broad product categories, such as hair care products, oral care products, digestive and confectionary products, health supplement products, skin and baby products, and home care products. In this specific example, the universe of retailers 312 defines a sample size of 127,220 retailers. Note that the text shown is illustrative only, and other indicia may be used to described the parameters and values. The retailers have been separated or segmented into four second coarse segmented buckets 334. The first coarse segmented buckets 330 are not shown. A first bucket 414 may represent retailers having total sales of less than $14/month, a second bucket 416 may represent retailers having total sales of greater than $14/month but less than $27/month, a third bucket 418 may represent retailers having total sales volume of greater than $27/month but less than $56/month, and a fourth bucket 420 may represent retailers having total sales of greater than $56/month.

In this illustrated example, regression analysis is applied to each of the four buckets 414-420 individually using variables selected from the regression segmentation variables 372. To process the buckets, each of the retailers in a selected bucket is marked as a logical one to identify it as the target, while the retailers in the remaining three buckets are marked as a logical zero. In this specific example, the fourth bucket 420 (representing retailers having a sales volume>$56/month) is processed first. Regression is applied using the regression segmentation variables 372 at a 95% confidence level using a backward elimination process. This is repeated for each of the remaining three buckets. The result of such regression analysis using the regression segmentation variables 372 as applied to the fourth bucket 420 for example, is shown in Table 2 below.

TABLE 2

REGRESSION RESULTS FOR BUCKET NO. 4

| Regression Segmentation Variable | Estimates | P-Value | Standard | Weight |
|---|---|---|---|---|
| Variable 1 | 0.8777 | <.0001 | 0.4466 | 0.4466 |
| Variable 2 | 0.4457 | <.0001 | 0.2765 | 0.2765 |
| Variable 3 | 0.2065 | <.0001 | 0.2608 | 0.2608 |
| Variable 4 | 0.0105 | <.0001 | 0.1774 | 0.1774 |

In this specific example, the weight, which is a standardized estimate, may indicate which variable or variables are more important or influential with respect to the fourth bucket. Table 2 shows only the four most important variables as a result of the regression analysis of the fourth bucket 420. In Table 2, the coefficients are standardized and arranged in descending order to obtain the most important variables. Thus, in this example, Variable 1 (response to incentive type variable 362) is the most important or primary variable, while Variable 2 (purchase pattern type variable 360) is the second most important or secondary variable with respect to the fourth bucket 420. The two most important variables, namely Variable 1 and Variable 2, are applied to the fourth bucket 420 to perform further sub-division. Note that when regression analysis is performed for the first bucket 414, second bucket 416, and third bucket 418, an entirely different set of regression segmentation variables may (or may not) be identified as being pertinent. For example, as shown in the third bucket 418, segmentation regression analysis has identified Variable 8 (channel type variable 366) and Variable 3 (purchase pattern type variable 360) as being the two most important regression segmentation variables.

After segmentation regression analysis has been applied to determine the most important regression segmentation variables 372, each bucket is sub-divided based on selected ranges of the primary segmentation variable, as described below. In this specific example, the fourth bucket 420 is sub-divided into sub-segment 426 (no presence of Variable 1) and sub-segment 428 (presence of Variable 1). Note that the value of the regression segmentation variables 372 may be a rational number or may assume a Boolean value. For example, a particular regression segmentation variable may indicate the presence or absence of a retailer discount, where a zero indicates that no dealer discount exists, and a one indicates that a dealer discount does exist.

The retailers of sub-segment 426 are further divided into final sub-segment "O" (Variable 2<=2) and final sub-segment "P" (Variable 2>=2) based on the value of the secondary regression segmentation variable, namely, Variable 2. Similarly, the retailers of sub-segment 428 are further divided into final sub-segment "Q" (Variable 2<=3) and final sub-segment "R" (Variable 2>3) based on the value of Variable 2. The first, second, and third buckets 414-418 are also sub-divided as described above by separately applying segmentation regression analysis to that bucket. Thus, the retailers of the first bucket 414 are divided into sub-segments 434 and 436, the retailers of the second bucket 416 are divided into sub-segments 438 and 440, and the retailers of the third bucket 418 are divided into three sub-segments, namely 442, 444, and 446.

Two approaches may be used, for example, to sub-divide each bucket 414-420 into sub-segments based on the two most important segmentation regression variables. A first approach is referred to as a numerical inspection approach, while a second approach is referred to as a purity index approach. The objective of each approach is to establish the cut-off values for the primary and secondary segmentation regression variables so that final sub-segments may be identified.

For example, using the numerical inspection approach, sub-segment 426 may be inspected to determine the distribution of data with respect to Variable 2. Data corresponding to Variable 2 may be arranged in ascending order to determine if a sharp jump exists in revenue based on the values of Variable 2 within the sub-segment 26. Where such a sharp change exists, that point may be selected as the cut-off range for the sub-segment. Thus, as shown in FIG. 4, a sharp difference in revenue based on the value for Variable 2 may exist above and below the value of 2, which defines additional sub-segments or final sub-segments "O" and "P," which are referred to as final sub-segments.

Using the purity index approach, the values of Variable 2 are iterated. For example, assume that the minimum value of Variable 2 shown in sub-segment 426 is 0, and the maximum value of Variable 2 shown in sub-segment 426 is 7. The regression analysis is serially performed as the values are iteratively processed from 0 to 7. In a first iteration, the retailers are separated according to revenue based on the value of Variable 2 to determine the difference in revenue between the two groups. The groups may be divided based on Variable 2=(0 to 1) and Variable 2=(1 to 7). Similarly, in a second iteration the retailers are separated with Variable 2=(0 to 2) and Variable 2=(2 to 7). This is repeated seven times. The point at which the difference is the greatest establishes the cut-off point for the sub-segments. The segmentation process described above using regression analysis may be referred to as an "objective" segmentation approach.

Note that "subjective" segmentation (the first and second coarse segmentation) may separate the retailers into buckets irrespective of the final objective of the segmentation process. Use of only a subjective segmentation approach may fail to optimize the spend drivers within the segment due to the different spending patterns within a segment or sub-segment. Processing the segments using objective segmentation in addition to subjective segmentation provides more accurate and homogeneous segmentation. This may occur because as sales revenues increase for a particular retailer, the opportunity to access more discounts increases. Accordingly, there are significant differences in the way in which a retailer having high sales revenues is exposed to a discount and/or available discount scheme relative to a retailer having a low sales revenue. Thus, the initial sales revenue used for segmentation may be considered to be a "surrogate" variable for the discount and optimization.

Note that for purposes of illustration only, FIG. 4 shows each of the sub-segments sub-divided into two final sub-segments each. However, the sub-segments may be further divided into any suitable number of final sub-segments, as supported by the corresponding data. The sub-segments having a letter designation are referred to as final sub-segments ("A"-"R"). Preferably, the total number of final sub-segments is between about 8 and about 20. As the number of final sub-segments increases above 20, the cost of implementing this approach becomes expensive compared to the money saved due to optimization of the spending parameters. In some applications the number of selling entities is at least 20,000.

As the number of segments increases, processing requirements increase. Application of various software modules may also become time intensive without applying an upper limit on the number of final segments.

Segmentation regression analysis 348 is performed so that each of the final sub-segments ("A"-"R") contains between about 5% to about 10% of the total number of retailers 312, or universe of retailers. Thus, for the illustrated example having 127,220 retailers, each final sub-segment, on average, may contain data corresponding to between about 6,360 retailers (5%) to about 12,720 retailers (10%). Accordingly, such a large number of data points in each final sub-segment imply a fragmented market. In some applications, a final sub-segment may contain data for as few as about 1,000 retailers based on twenty buckets derived from a universe of about 20,000 retailers. A smaller universe of retailers may not provide a statistically significant sample size for analysis.

After the final sub-segments ("A"-"R") have been identified, a further level of regression analysis (referred to as spend driver regression analysis) is applied to each final sub-segment ("A"-"R") to identify the spend drivers or spending parameters that have the greatest influence. Note that during spend driver regression analysis, regression is performed only with respect to variables considered to be spend drivers. Thus, within each final sub-segment ("A"-"R"), the revenue value is regressed with respect to the spend drivers or spend variables to determine which spend drivers have the greatest influence. The result of spend driver regression analysis is a plurality of response curves showing profit for a particular product or product group as a function of the selected spend driver. Profit may be maximized by selecting the optimal value of the corresponding spend driver.

Different regression processes may be used to generate the response curves and to perform final segmentation. For example, regression trees, Chi-squared regression, least squares regression, regression sum of sequences, error sum of sequences, and other regression processes and techniques may be used.

After the final sub-segments ("A"-"R") have been identified, which contain retailer data having substantially homogeneous responses to pertinent spend variables, response curves may be produced for each product category and for each of the significant spend drivers. Thus, in the example of FIG. 4, response curves corresponding to the spend drivers of interest may be produced for each of the product categories, namely, hair care products, oral care products, digestive and confectionary products, health supplement products, skin and baby products, and home care products. Many different spend variables may be used to produce the corresponding response curves. Such response curves may be generated for each final sub-segment. For example, Table 3 below lists some exemplary variables that may be used in accordance with the business model described with respect to FIG. 4 (e.g., six broad product categories). Accordingly, some of the spend variables may change depending on the product mix of the business under analysis.

TABLE 3

SPEND DRIVERS

Average Monthly Scheme amount for a Retailer
Average Monthly Discount Amount for a Retailer
Average Monthly Visual Display Discount for a Retailer
Average Monthly Distributor Discount for a Retailer
Average Monthly Product-wise Distributor Discount (not cash)
Average Monthly Scheme Amount as a percentage of Invoice Amount
Average Monthly Discount Amount as a percentage of Invoice Amount

TABLE 3-continued

SPEND DRIVERS

Average Monthly Visual Amount as a percentage of Invoice Amount
Average Monthly Distributor Discount as a percentage of Invoice Amount
Average Scheme Amount for Skin and Baby Product category
Average Scheme Amount for Home Care Product category
Average Scheme Amount for Health Supplement Product category
Average Scheme Amount for Hair Care Product category
Average Scheme Amount for Oral Care Product category
Average Scheme Amount for Digestive and Confectionary Product category
Average Monthly Secondary Spends on Skin and Baby
Average Monthly Primary Spends on Skin and Baby
Average Monthly Secondary Spends on Home Care
Average Monthly Primary Spends on Home Care
Average Monthly Secondary Spends on Health Supplement
Average Monthly Primary Spends on Health Supplement
Average Monthly Secondary Spends on Hair Care
Average Monthly Primary Spends on Hair Care
Average Monthly Secondary Spends on Oral Care
Average Monthly Primary Spends on Oral Care
Average Monthly Secondary Spends on Digestive and Confectionary
Average Monthly Primary Spends on Digestive and Confectionary
Average Monthly Secondary Discount Percentage on Skin and Baby
Average Monthly Secondary Discount Percentage on Hair Care
Average Monthly Secondary Discount Percentage on Oral Care
Average Monthly Secondary Discount Percentage on Digestive and Confectionary
Average Monthly Secondary Discount Percentage on Home Care
Average Monthly Secondary Discount Percentage on Health Supplements
Average Monthly Primary Discount Percentage on Skin and Baby
Average Monthly Primary Discount Percentage on Hair Care
Average Monthly Primary Discount Percentage on Oral Care
Average Monthly Primary Discount Percentage on Digestive and Confectionary
Average Monthly Primary Discount Percentage on Home Care
Average Monthly Primary Discount Percentage on Health Supplements
Dealer Discount Percentage
Discount Percentages
Discount Percentages
Discount Percentages
Discount Percentages
Discount Percentages
Discount Percentages Some of the above variables in Table 3 may be derived from other variables captured from the business environment. For example, data from point of sale terminals shown in Table 4 below, data from retailer and stockists shown in Table 5 below, and data from Product Hierarchy and Scheme Calendars shown in Table 6 below, may be used to derive some of the variables shown in Table 1, as follows:

TABLE 4

POINT OF SALE VARIABLES

Retailer Code
Invoice Code
Product Code
Stockist Code
Date of Bill
Total Bill Amount
Total Net Amount
Product-wise Quantity
Scheme Discount
Distributor Discount
Window Display Amount
Total Discount to the Retailer
Special Discount

TABLE 5

RETAILER AND STOCKIST INFORMATION

Stockist Code
Retailer Code
Channel Code
Stockist Type
Geo Zone Code
Geo State Code
Geo District Code
Population Code
Geo Zone Name
Geo State Name
Geo District Name

TABLE 6

PRODUCT HIERARCHY AND SCHEME CALENDARS

Product Code
Price to Stockist at SKU level
Profit Margin of Stockists
Geo State Code
Scheme Spends to Retailers (Product-wise)
Scheme Spends to Stockists (Product-wise)
Category Type
Brand Type
Product Type Once the spend drivers have been optimized, the spend drivers having the most impact (most significant spend levers) or effect on profit may be selected for iterative analysis. Analysis may be performed again using the most significant spend drivers to fine tune the spend lever curves.

Figure 5:
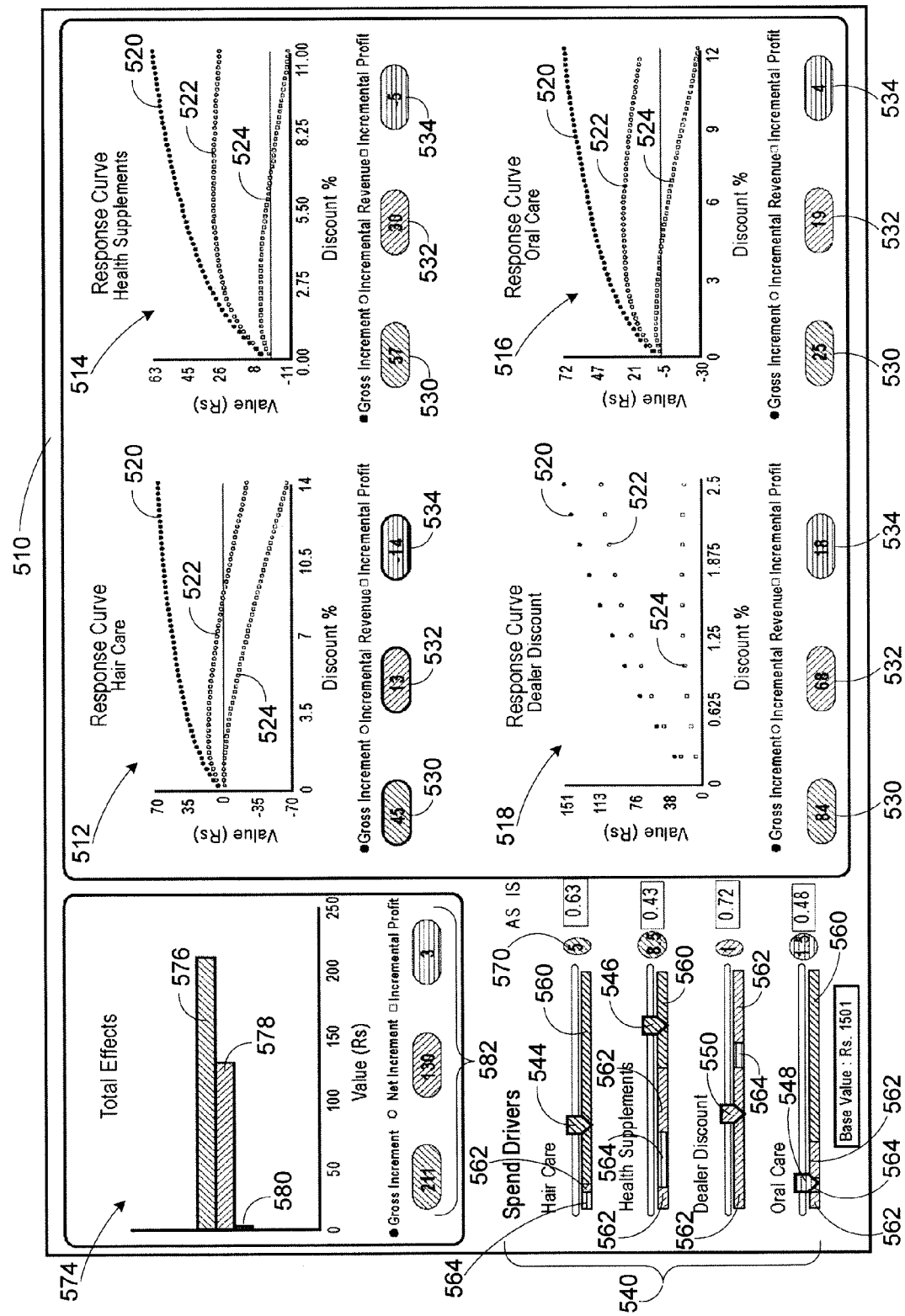
FIG. 5 shows a specific example of a graphical output report.

FIG. 5 shows a graphical output report 510 generated in accordance with the data provided in the example of FIG. 4. The information may be provided in the form of a "dashboard." The output report 510 includes a first response graph 512 corresponding to hair care products based on discount percentage, a second response graph 514 corresponding to health supplement products based on discount percentage, a third response graph 516 corresponding to oral care products based on discount percentage, and a fourth response graph 518 corresponding to dealer discounts based on discount percentage. Each response curve corresponds to one final sub-segment. Each response graph 512-516 shows response curves for gross increment 520, incremental revenue 522, and incremental profit 524. Corresponding numerical values are shown in oval areas representing gross increment 530, incremental revenue 532, and incremental profit 534 as a function of a user-settable value corresponding to the spending lever.

The response graph for total dealer discount 518 is capped at a maximum of 2.5%. In this specific response graph 518, the dealer discount is not specific to a product, as is the case for the response curves relating to hair care products 512, health supplement products 514, and oral care products 516. Rather, in this response graph 518, the dealer discount is in the form of a cash discount that the manufacturer provides to the retailer based on the total bill or invoice, irrespective of the products involved.

The response graphs 512, 514, 516, and 518 may indicate that increased net profit correlates with an increase in the spend driver (up to an optimal point). This means that incentives provided to the retailer for a particular product or product category translate into more profit for that product. On the other hand, the response curves may show that net profit is relatively unaffected by changes in the value of the spend driver. This may occur in certain circumstances, such as when a group of consumers is very brand loyal and is not willing to switch to an "incentivized" product.

The graphical output report 510 includes a user-settable slide graph 540 that provides slidable tabs that the user may dynamically adjust to change the level of the corresponding driver. The user may adjust a hair care spend driver 544, a health supplement spend driver 546, an oral care spend driver 548, and a dealer discount spend driver 550 by moving the graphically displayed slidable tab along the horizontal axis. As the user changes the value of the spend driver along the slide graph 540, the value of the incremental profit changes accordingly.

Each of the four slide graphs 540 includes three portions, which would be shown in red, yellow, and green in a color representation. To indicate this in the black and white illustration of FIG. 5, a red portion is shown as reference numeral 560, and indicates a negative or undesirable value of incremental profit given a selected value of the spend driver based on the horizontal position of the sliding tab. A yellow portion is shown as reference numeral 562, and indicates a positive but not optimal value of incremental profit given a selected value of the spend driver based on the horizontal position of the sliding tab. A green portion is shown as reference numeral 564, and indicates a positive and optimal value of incremental profit given a selected value of the spend driver based on the horizontal position of the sliding tab.

As shown in the user-settable slide graph 540, when the tab is placed over a red section 560, the value for incremental profit is negative, which of course, is undesirable. The user may move the slide tab so that it corresponds to a green portion 564, which represents a positive incremental profit. Movement of the slide tab along a green segment maximizes incremental profit, as shown numerically in numerical output display portions 570.

A total effects display area 574 shows the total effects of changes in the various spend drivers as the user moves the sliding tabs. The total effects display area 574 shows the total effects for gross increment 576, net increment 578, and incremental profit 580 as the value of the corresponding spend drivers are dynamically increased and decreased by the user. The value of gross increment 576, net increment 578, and incremental profit 580 are also shown in numerical output display portions 582. The total effects display area 574 illustrates the total effect that all of the spend drivers have on gross increment 576, net increment 578, and incremental profit 580. By optimizing the various spend drivers, profit may be maximized.

In some situations, and in particular with large manufacturers, revenue may typically be enhanced by about 6% by using the system for optimizing trade promotion and distribution spending 114. Similarly, if revenue is kept constant, a cost reduction of about 10% to 15% may be realized for trade schemes and discounts. Such revenue changes may be realized provided that there are no macro-economic changes (e.g., global economic recession).

The report generator 176 that produces the graphical output report 510 may be a commercially available product that receives data from the system for optimizing trade promotion and distribution spending 114, and produces a graphical output report. Such a report generator may be a Crystal Xcelsius report generator available from Business Objects Corp. (an SAP company).

Figure 6:
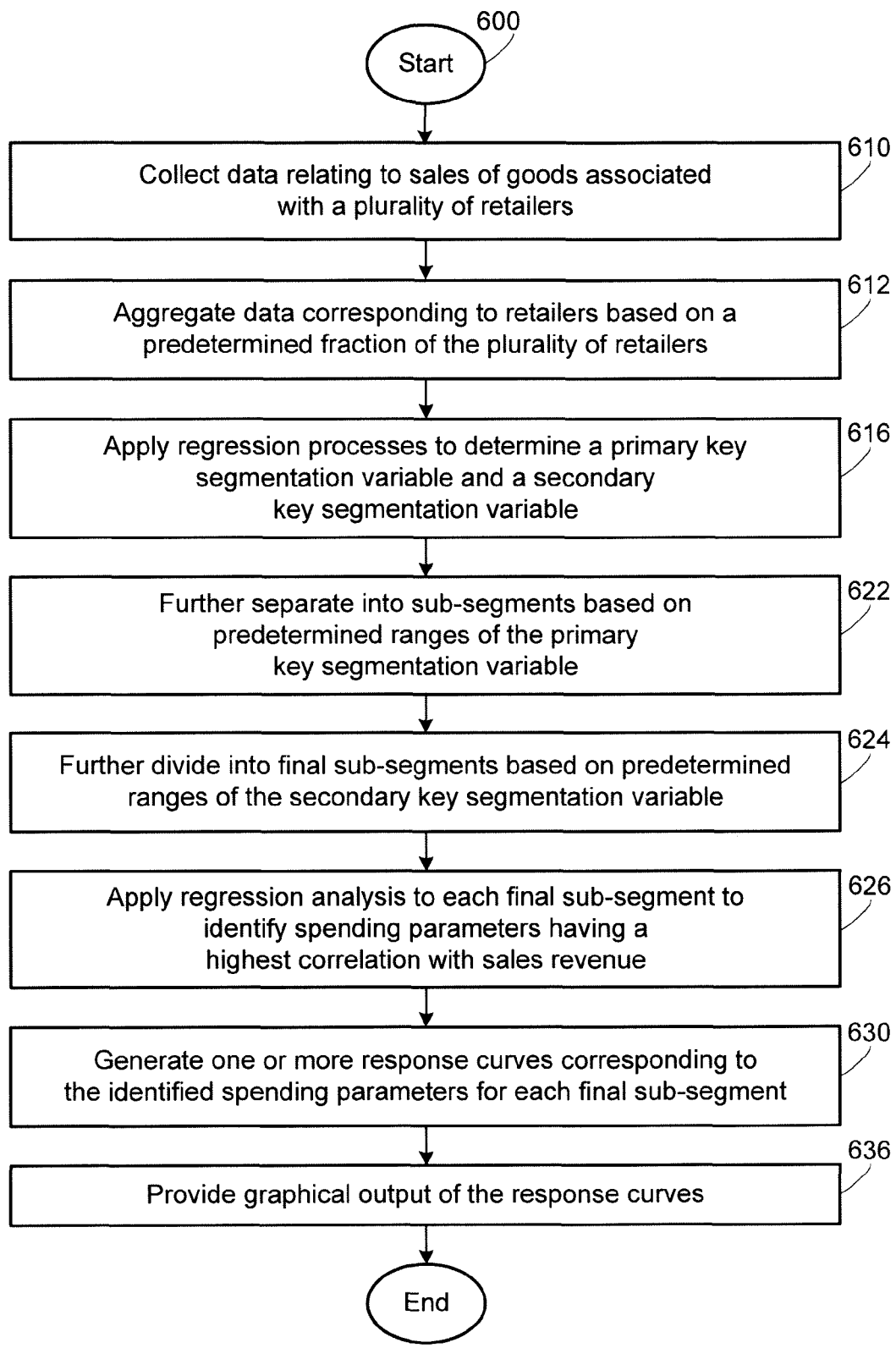
FIG. 6 is a flowchart showing processing of trade promotion and distribution spending in fragmented markets.

FIG. 6 is a flowchart showing the acts 600 that may be taken to optimize trade promotion and distribution spending in a fragmented market. First, data is collected relating to sales of goods associated with a plurality of retailer (Act 610). The aggregated data corresponding to retailers is separated into coarse segments based on a predetermined fraction of the plurality of retailers relative to a total number of retailers (Act 612). For example, 5% of the retailers may be separated into the first of twenty coarse segments, which may be further organized into second coarse segments. Each coarse segment may be analyzed using regression processes based on key segmentation variables so as to determine a primary key segmentation variable and a secondary key segmentation variable (Act 616). The primary and secondary key segmentation variables exhibit the highest correlation with sales revenue. The aggregated data corresponding to retailers is further separated into sub-segments based on predetermined ranges of the primary key segmentation variable (Act 622). The sub-segments are further divided into final sub-segments based on predetermined ranges of the secondary key segmentation variable (Act 624). Next, regression analysis is applied to each final sub-segment to identify spending parameters having a highest correlation with sales revenue (Act 626). For each final sub-segment, one or more response curves are generated corresponding to the identified spending parameters (Act 630). A report generator may provide a graphical output of the response curves (Act 636), where the respective response curves provide an indication of the relationship between a selected value of the identified spending parameter and a profit level of the manufacturer.

In some configurations, the system for optimizing trade promotion and distribution spending 114 may be provided to a customer on a stand-alone basis. In such a configuration, the customer may implement the system in the customer's computing platform so that the customer can refine the spend levers over time as a particular spending scheme matures or ends and results corresponding to that scheme have been evaluated. In other configurations, a customer may employ a business consultant or team of business consultants to implement and operate the system for optimizing trade promotion and distribution spending 114 and provide the output or report to the customer's management team. The business consultants may provide analysis and insight to the customer based on the results generated by the system for optimizing trade promotion and distribution spending.

Note that the above generally describes processing with respect to data associated with a plurality of retailers. However, the system for optimizing trade promotion and distribution spending 114 may also be applied to other selling entities to achieve similar results. Accordingly, the processes of data collection, segmentation, regression analysis, and response curve generation may also be applied to the channel partners, such as the carrying and forwarding agents, distributors, and wholesalers. Further, the above-described systems and methods are not limited to the gathering and processing of data related to goods. Such systems and methods may be applied to services as well as goods, such as services provided by the telecommunication and pharmaceutical industries, for example. Any product, whether a good or a service, typically sold in a market economy may be optimized using the systems and methods described in this document.

Figure 7:
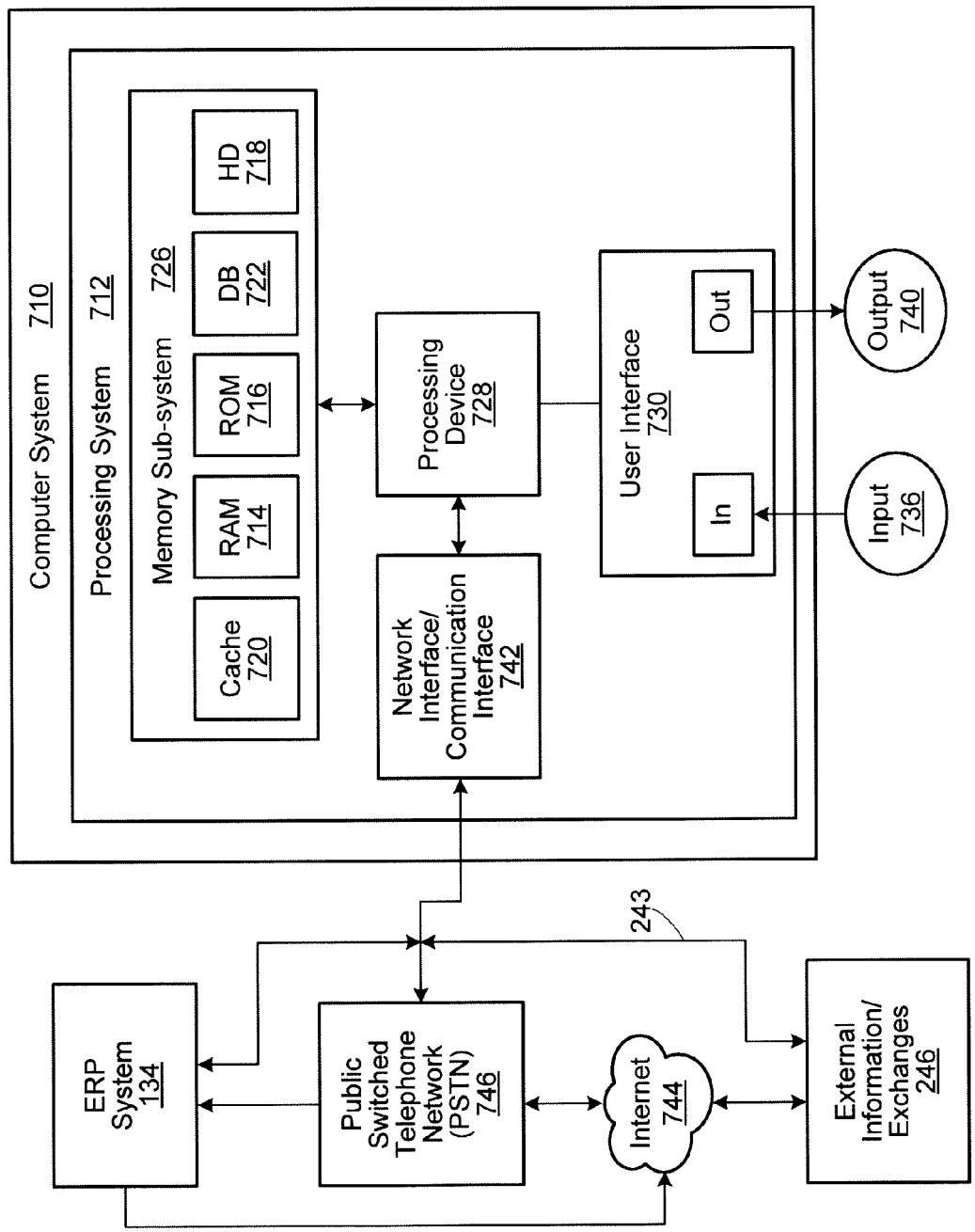
FIG. 7 shows a computing platform and environment.

The system for optimizing trade promotion and distribution spending 114 may be embodied as a system cooperating with computer hardware components and/or as a computer-implemented method. Referring now to FIG. 7, a specific embodiment of a high-level hardware block diagram of a computer system on which the above-described system and method may be implemented is shown generally. A computer system 710 includes a computer or processing system 712, which includes various hardware components, such as RAM 714, ROM 716, hard disk storage 718, cache memory 720, database storage 722, and the like (also referred to as "memory subsystem" 726). The computer system 712 may include any suitable processing device 728, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 728 may be an Intel Pentium® microprocessor, x86 compatible microprocessor, or equivalent device. The processing system 712 may include or may be programmed to provide both a segmentation process or module and an analysis process or processor. Segmentation and analysis processing may be performed in hardware, software, or a combination of hardware and software.

The memory subsystem 726 may include any suitable storage components, such as RAM, EPROM (electrically programmable ROM), flash memory, dynamic memory, static memory, FIFO (first-in first-out) memory, LIFO (last-in first-out) memory, circular memory, semiconductor memory, bubble memory, buffer memory, disk memory, optical memory, cache memory, and the like. Any suitable form of memory may be used whether fixed storage on a magnetic medium, storage in a semiconductor device, or remote storage accessible through a communication link. A user or system manager interface 730 may be coupled to the computer system 712 and may include various input devices 736, such as switches selectable by the system manager and/or a keyboard. The user interface also may include suitable output devices 740, such as an LCD display, a CRT, various LED indicators, and/or a speech output device, as is known in the art.

To facilitate communication between the computer system 712 and external sources, a communication interface 742 may be operatively coupled to the computer system. The communication interface 742 may be, for example, a local area network, such as an Ethernet network, intranet, Internet, or other suitable network 744. The communication interface 742 may also be connected to a public switched telephone network (PSTN) 746 or POTS (plain old telephone system), which may facilitate communication via the Internet 744. Dedicated and remote networks may also be employed, and the system may further communicate with external exchanges and sources of information 746. Any suitable commercially-available communication device or network may be used.

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan) and then compiled and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors.

The system for optimizing incentive-based spending parameters associated with goods provided by a manufacturer in fragmented markets includes a computer having a processor and memory, data collection means for aggregating data for sales of goods associated with a plurality of retailers, segmentation means for separating the aggregated data corresponding to retailers into coarse segments based on a predetermined portion of the plurality of retailers, and analysis means for applying regression analysis to each of the coarse segments based on key segmentation variables to determine a primary key segmentation variable and a secondary key segmentation variable, where the primary and a secondary key segmentation variables having a highest correlation with sales revenue. The segmentation means further separates the aggregated data corresponding to retailers into sub-segments based on predetermined ranges of the primary key segmentation variable, and further divides the sub-segments into final sub-segments based on predetermined ranges of the secondary key segmentation variable. The analysis means applies regression analysis to each final sub-segment to identify incentive-based spending parameters having a highest correlation with sales revenue and the analysis means generates for each final sub-segment one or more response curves corresponding to the identified incentive-based spending parameters. Reporting means provides a graphical output of the response curves, where the respective response curves provide an indication of a relationship between a selected value of the identified incentive-based spending parameter and a profit level of the manufacturer.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for optimizing incentive-based spending parameters associated with goods provided by a manufacturer in fragmented markets, the system comprising:
  a computer having a processor and memory;

a data collection component in communication with the processor and configured to aggregate data for sales of goods associated with a plurality of retailers;

a segmentation module controlled by the processor and configured to separate the aggregated data corresponding to retailers into coarse segments based on a predetermined portion of the plurality of retailers, the coarse segments separated in accordance with a volume of sales for each retailer irrespective of the value of the corresponding volume of sales;

an analysis module controlled by the processor and configured to apply regression analysis to each of the coarse segments, the regression analysis controlled by the processor based on key segmentation variables to determine a primary key segmentation variable and a secondary key segmentation variable, the primary and the secondary key segmentation variables having a highest correlation with sales revenue;

the segmentation module configured to further separate the aggregated data corresponding to retailers into sub-segments based on predetermined ranges of the primary key segmentation variable, and further divide the sub-segments into final sub-segments based on predetermined ranges of the secondary key segmentation variable, wherein the number of final sub-segments is between about 8 and about 20;

the analysis module configured to apply regression analysis to each final sub-segment to identify incentive-based spending parameters having a highest correlation with sales revenue;

the analysis module configured to generate, under control of the processor, for each final sub-segment, one or more response curves corresponding to the identified incentive-based spending parameters; and a report generator controlled by the processor and adapted to provide a graphical output of the response curves, the respective response curves providing an indication of a relationship between a selected value of the identified incentive-based spending parameter and a profit level of the manufacturer wherein the manufacturer is associated with at least 1 million selling entities in a fragmented market.

2. The system according to claim 1, wherein the segmentation module is configured to separate the aggregated data corresponding to selling entities into the coarse segments based on a predetermined parameter before the final segments are generated.

3. The system according to claim 2, wherein the predetermined parameter corresponds to predetermined portion of the sales entities relative to a total number of sales entities.

4. The system according to claim 1, wherein the retailers are selling entities.

5. The system according to claim 1, wherein the retailers include channel partners.

6. The system according to claim 5, wherein the channel partners include carrying and forwarding agents, distributors, wholesalers, and/or retailers.

7. The system according to claim 1, wherein the incentive-based spending parameters include product scheme discounts, trade discounts, trade promotions, trade incentives, servicing spends, and/or merchandizing spends.

8. The system according to claim 1, wherein the final segments based on selected ranges of the identified key segmentation variable represent substantially homogeneous groups of selling entities.

9. The system according to claim 1, wherein the key segmentation variables correspond to purchase patterns, response to incentives, demographics, business channels, and/or categories.

10. The system according to claim 1, wherein the analysis module optimizes the incentive-based spending parameters for a product category to maximize profit for the manufacturer.

11. The system according to claim 1, wherein the respective response curves provide an indication of a relationship between a selected value of the identified incentive-based spending parameter and a profit level of the manufacturer.

12. The system according to claim 1, wherein the incentive-based spending parameters identified by regression analysis are highly correlated with a sales revenue value so that an optimal value of the incentive-based spending parameter results in a maximum value of profit.

13. The system according to claim 1, wherein a market is fragmented if a manufacturer is associated with at least 1 million selling entities.

14. The system according to claim 1, wherein the incentive-based spending parameters identified by regression analysis are highly correlated with a sales revenue value so that an optimal value of the incentive-based spending parameter results in a maximum value of profit.

15. A computer-implemented method for optimizing incentive-based spending parameters associated with goods provided by a manufacturer in fragmented markets, the method comprising:

collecting, by a processor, data relating to goods associated with a plurality of selling entities;

applying regression analysis, using a processor, to a portion of the data corresponding to the plurality of selling entities based on key segmentation variables to identify a key segmentation variable having a highest correlation with sales revenue;

separating, using a processor, the data corresponding to the selling entities into coarse segments based on a predetermined portion of the plurality of selling entities, the course segments separated in accordance with a volume of sales for each selling entity irrespective of the value of the corresponding volume of sales for the corresponding selling entity;

applying regression analysis, using a processor, to each of the coarse segments based on key segmentation variables to determine a primary key segmentation variable and a secondary key segmentation variable, the primary and the secondary key segmentation variables having a highest correlation with sales revenue;

separating, using a processor, the aggregated data corresponding to selling entities into sub-segments based on predetermined ranges of the primary key segmentation variable, and further dividing the sub-segments into final sub-segments based on predetermined ranges of the secondary key segmentation variable, wherein the number of final sub-segments is between about 8 and about 20;

separating, using a processor, the data corresponding to the selling entities into final sub-segments based on selected ranges of the identified key segmentation variable;

applying, using a processor, regression analysis to each final sub-segment to identify incentive-based spending parameters having a highest correlation with sales revenue;

generating, using a processor, for each final sub-segment one or more response curves corresponding to the identified incentive-based spending parameters; and providing a graphical output of the respective response, wherein respective response curves provide an indication of a relationship between a selected value of the identified incentive-based spending parameter and a profit level of the manufacturer, and wherein the manufacturer is associated with at least 1 million selling entities in a fragmented market.

16. The computer-implemented method according to claim 15, further comprising separating, by the processor, the aggregated data corresponding to selling entities into coarse segments based on a predetermined parameter before the final segments are generated.

17. The computer-implemented method according to claim 16, wherein the predetermined parameter corresponds to a predetermined portion of the sales entities relative to a total number of sales entities.

18. The computer-implemented method according to claim 15, wherein the selling entities are retailers.

19. The computer-implemented method according to claim 15, wherein the selling entities are channel partners.

20. The computer-implemented method according to claim 19, wherein the channel partners include carrying and forwarding agents, distributors, wholesalers, and/or retailers.

21. The computer-implemented system according to claim 15, wherein the key segmentation variables correspond to purchase patterns, response to incentives, demographics, business channels, and/or categories.

22. The computer-implemented method according to claim 15 wherein the respective response curves provide an indication of a relationship between a selected value of the identified incentive-based spending parameter and a profit level of the manufacturer.

23. The computer-implemented method according to claim 15, wherein the incentive-based spending parameters identified by regression analysis are highly correlated with a sales revenue value so that an optimal value of the incentive-based spending parameter results in a maximum value of profit.

24. The computer-implemented method according to claim 15, wherein a market is fragmented if a manufacturer is associated with at least 1 million selling entities.

25. A computer-implemented method for optimizing incentive-based spending parameters associated with goods provided by a manufacturer in fragmented markets, the method comprising:
  collecting data, using a processor, relating to sales of goods associated with a plurality of retailers;
  separating, using a processor, the aggregated data corresponding to retailers into coarse segments based on a predetermined portion of the plurality of retailers, the coarse segments in accordance with a volume of sales for each retailer irrespective of the value of the corresponding volume of sales;
  applying regression analysis, using a processor, to each of the coarse segments based on key segmentation variables to determine a primary key segmentation variable and a secondary key segmentation variable, the primary and the secondary key segmentation variables having a highest correlation with sales revenue;
  separating, using a processor, the aggregated data corresponding to retailers into sub-segments based on predetermined ranges of the primary key segmentation variable;
  dividing, using a processor, the sub-segments into final sub-segments based on predetermined ranges of the secondary key segmentation variable, wherein the number of final sub-segments is between about 8 and about 20;
  applying regression analysis, using a processor, to each final sub-segment to identify incentive-based spending parameters having a highest correlation with sales revenue;
  generating, using a processor, for each final sub-segment one or more response curves corresponding to the identified incentive-based spending parameters; and
  providing a graphical output of the response curves, the respective response curves providing an indication of the relationship between a selected value of the identified incentive-based spending parameter and a profit level of the manufacturer wherein the manufacturer is associated with at least 1 million selling entities in a fragmented market.

* * * * *